United States Patent Office 2,735,780
Patented Feb. 21, 1956

2,735,780

MARKING COMPOSITIONS

George C. Le Compte, Arlington, Va., and Waldo C. Ault, Philadelphia, Pa., assignors to the United States of America as represented by the Secretary of Agriculture No Drawing. Application November 17, 1950, Serial No. 196,337

4 Claims. (Cl. 106—19)

(Granted under Title 35, U. S. Code (1952), sec. 266)

The invention herein described may be manufactured and used by or for the Government of the United States of America for governmental purposes throughout the world without the payment to us of any royalty thereon.

This invention relates to marking compositions.

Most branding paints used for the marking of sheep contain drying oils and/or tar-like substances and hence cannot be readily removed from the wool by conventional scouring methods utilizing aqueous alkaline soap solutions or organic solvents such as a petroleum fraction.

Branding paints using wool grease as a base are removed readily and completely by the usual scouring techniques. Since wool grease is a viscous, tenacious semisolid substance, such branding paints are made by compounding wool grease with pigments and solvents which are used to give the paint the necessary fluid consistency. However, branding paints based on wool grease are not entirely satisfactory because no combination of solvent and wool grease is known which retains the proper consistency over the relatively wide temperature ranges commonly encountered under actual conditions of use.

We have found that a wool grease fraction having unique and vastly improved temperature-viscosity characteristics can be obtained by a low temperature solvent separation method which comprises cooling a solution of wool grease in a suitable organic solvent, segregating the material that separates from the solution at moderately reduced temperature and recovering the residual wool grease fraction of the solution.

The wool grease fraction thus obtained is more fluid than whole wool grease, and its viscosity does not undergo excessive changes over a relatively wide temperature range, so that it is eminently well adapted for use as a vehicle in the production of branding paints and other similar marking compositions.

In accordance with the method of our invention wool grease is dissolved, preferably with application of heat in the organic solvent and the solution is cooled to, and maintained at, a temperature of from about 0° to about 10° C., until the amount of precipitate that separates from the solution ceases to increase and an extract is obtained which has a viscosity of about 75 to 165 poises at 20° C. and of about 44 to 47 poises at 30° C. The time required to effect the desired precipitation will vary with efficiency of the cooling operation, but we have had excellent results by cooling for 12–24 hours. The precipitate is then removed by any suitable procedure such as by filtration, and the residual wool grease fraction is recovered from the solution, preferably by evaporation of the solvent.

Organic solvents best adapted for use in the process are the saturated aliphatic acyclic, oxygen containing solvents wherein the oxygen atom is bonded to only one carbon atom, and containing not more than 6 carbon atoms in the molecule, that is, the lower alcohols and ketones.

Suitable solvents include, for example, methyl, ethyl, isopropyl, butyl and isoamyl alcohol, acetone, methyl ethyl ketone and methyl isobutyl ketone. We prefer to use isopropyl alcohol or methyl ethyl ketone because of their ready availability, and because the crystalline structure of the precipitate which separates on cooling a solution of wool grease in these solvents facilitates its removal by filtration.

In the preparation of the solution the ratio of wool grease to solvent may be varied within relatively wide limits; thus ratios from about 1 to 10 parts of solvent per one part of wool grease may be used, although best results are usually obtained on using about 5 parts of solvent.

The following examples, wherein all parts are by weights, are given as illustrative embodiments of manner in which the invention may be practiced.

Example I

Crude wool grease was dissolved in 5 parts of 99 percent isopropyl alcohol. The solution was divided into 4 equal portions which were then maintained at 20°, 15°, 5°–7° and 0.5° C., respectively, until the amount of the precipitate which separated from the solution ceased to increase. The solution was then filtered and the filtrates evaporated to dryness. The characteristics and yields of the respective precipitates and evaporation residues thus obtained are shown in the following table.

TABLE I

| Separation Temperature, °C. | Fraction | Yield, Percent | Saponification Number | Acid Number | Ester Value |
|---|---|---|---|---|---|
| 20 | Precipitate | 16.3 | 99.1 | 5.9 | 93.2 |
|    | Residue | 83.7 | 106.7 | 18.5 | 88.2 |
| 15 | Precipitate | 36.5 | 102.2 | 12.3 | 89.9 |
|    | Residue | 63.5 | 118.6 | 25.1 | 93.5 |
| 5–7 | Precipitate | 43.7 | | | |
|    | Residue | 56.3 | 131.5 | 23.7 | 107.8 |
| 0.5 | Precipitate | 46.9 | | 6.0 | |
|    | Residue | 53.1 | | 23.1 | |

Relative differences in the physical properties of the fractions recovered on evaporation of the filtered solutions were estimated by means of viscosity measurements, as determined by the Brookfield viscosimeter, both on solvent free fractions and in carbon tetrachloride solutions, using 3 parts of solvent per 7 parts of wool grease fraction. The results so obtained are shown in Table II.

Table II

| Fraction obtained at— | Solvent Free Material, Viscosity (Poises) | | CCl₄ Solution, Viscosity (Poises) | |
|---|---|---|---|---|
| | 30° C. | 20° C. | 30° C. | 20° C. |
| 20° C | 82.8 | 459 | 0.82 | 20.4 |
| 15° C | 49.8 | 217 | 0.76 | 16.1 |
| 5–7° C | 47.2 | 165 | 1.0 | 6.1 |
| 0.5° C | 44.0 | 76 | 0.9 | 4.9 |
| Crude Wool Grease. | semisolid greater than 1,000 poises. | semisolid greater than 1,000 poises. | 0.7 | 24.5 |

These data show that the wool grease fractions recovered from the filtered solutions obtained at temperatures below 7° C. undergo less change in viscosity with changes in temperature, than those obtained at higher temperatures.

Example II 609.2 grams of crude wool grease were dissolved in 3046 ml. of methyl ethyl ketone, and the solution was maintained at 5° C. for approximately 16 hours after which time the separation of the precipitate was substantially completed. The precipitate, weighing 123.6 grams was removed by filtration. Evaporation of the filtrate yielded 475.8 grams of a wool grease fraction, having viscosity properties similar to those of the corresponding fraction obtained at 5–7° C. by the procedure of the foregoing example.

Similar results were obtained by analogous procedures using methyl alcohol, isoamyl alcohol, and acetone in place of isopropyl alcohol and methyl ethyl ketone, and causing separation of the precipitate from the solution at temperatures from about 10° C. to 0° C.

The viscosity of the wool grease fractions recovered from the filtrates following separation of the precipitates formed at temperatures from about 0° C. to about 10° C., is approximately that desired in a branding paint vehicle.

Branding paints were prepared by incorporating into these fractions from about 3 to about 5 percent by weight of inert pigments, either organic or inorganic, such as carbon black, iron oxide pigments, chromic oxide, barium sulfate and organic base pigments such as Monoastral Fast Blue, Monoastral Fast Green, Lithosol Fast Yellow HL, and Permanent Carmine FR-Extra. The pigments were incorporated by ground mixing, in a conventional manner with or without addition of suitable dispersing agents such as lecithin, monoglycerides and the like.

The durability of these branding paints was found satisfactory when tested on the fleece of range sheep. The markings were readily and completely removed from the wool on scouring with either alkaline aqueous soap solution, or gasoline.

We claim:

1. A marking composition consisting essentially of a pigment dispersed in a vehicle composed essentially of a wool grease fraction that is retained as solute on maintaining a solution of wool grease in a solvent of the group consisting of lower aliphatic alcohols and ketones at a temperature within the range of from about 0° to about 10° C.

2. A marking composition consisting essentially of a pigment dispersed in a wool grease fraction obtained by solvent extraction of wool grease at a temperature from about 0° to about 10° C., and which has a viscosity of about 75 to 165 poises at 20° C., and of about 44 to 47 poises at 30° C.

3. A marking composition consisting essentially of a pigment dispersed in a wool grease fraction having a viscosity of not more than about 165 poises at 20° C., and of not more than about 47 poises at 30° C., the wool grease fraction being that retained as solute in a solvent of the group consisting of lower aliphatic alcohols and ketones at temperatures from 5–7° C.

4. A marking composition consisting essentially of a pigment dispersed in a wool grease fraction which is fluid at room temperature and having a viscosity not exceeding about 165 poises at 20° C. and of about 47 poises at 30° C.

References Cited in the file of this patent

UNITED STATES PATENTS

| | | |
|---|---|---|
| 539,388 | Maertens | May 14, 1895 |
| 540,256 | Jaffe et al. | June 4, 1895 |
| 915,169 | Frank | Mar. 16, 1909 |
| 993,348 | Collinson | May 30, 1911 |
| 1,088,840 | Price | Mar. 3, 1914 |
| 1,487,873 | Marston | Mar. 25, 1924 |
| 2,519,321 | Newman | Aug. 15, 1950 |

OTHER REFERENCES

Gillespie: "Wool Wax" (1948), pages 28–30.

"Printing Inks," Ellis, 1940, pgs. 116, 117, 258, 346, and 347.

"Uses and Applications of Chemicals and Related Materials," Gregory, 1939, pages 634 and 640.

Borntrager: "Zeitschrift fur Analytische Chemie," 39 (1900), 505.

Charitschkoff: "Chem. Rev. Fett, Harz. Ind." 12 (1905) (J. C. S. 1905 Ai 405), pp. 106–9.

Bailey: "Melting and Solidifying Fats" (April 1950), pp. 251, 252, 255 and 275.